(12) United States Patent
Khafagy et al.

(10) Patent No.: US 10,399,554 B2
(45) Date of Patent: Sep. 3, 2019

(54) HYBRID VEHICLE WITH AUTO STOP START CONTROLLERS

(71) Applicant: FORD GLOBAL TECHNOLOGIES, LLC, Dearborn, MI (US)

(72) Inventors: Hafiz Shafeek Khafagy, Dearborn, MI (US); Hussam Makkiya, Troy, MI (US); Jonathan Edward Gunger, Canton, MI (US); Kirt Eschtruth, Livonia, MI (US); Ahmed Awadi, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

(21) Appl. No.: 15/653,867

(22) Filed: Jul. 19, 2017

(65) Prior Publication Data

US 2019/0023256 A1 Jan. 24, 2019

(51) Int. Cl.
*B60W 20/00* (2016.01)
*B60W 20/10* (2016.01)
*B60W 30/02* (2012.01)
*B60W 30/18* (2012.01)

(52) U.S. Cl.
CPC ............ *B60W 20/10* (2013.01); *B60W 30/02* (2013.01); *B60W 30/18018* (2013.01); *B60W 2510/069* (2013.01); *B60W 2510/202* (2013.01)

(58) Field of Classification Search
None
See application file for complete search history.

(56) References Cited

U.S. PATENT DOCUMENTS

| | | | | |
|---|---|---|---|---|
| 6,316,842 | B1 * | 11/2001 | Kuroda | B60K 6/48 180/65.25 |
| 7,610,143 | B1 * | 10/2009 | Boesch | B60K 6/365 701/112 |
| 8,498,802 | B2 | 7/2013 | Yamamoto | |
| 8,688,350 | B2 | 4/2014 | Carlhammar et al. | |
| 9,020,659 | B2 | 4/2015 | Harris et al. | |
| 2004/0046394 | A1 * | 3/2004 | Lim | B60K 6/485 290/400 |
| 2009/0062062 | A1 * | 3/2009 | Choi | B60K 6/543 477/5 |

(Continued)

*Primary Examiner* — Truc M Do
(74) *Attorney, Agent, or Firm* — David B. Kelley; Brooks Kushman P.C.

(57) ABSTRACT

A hybrid electric vehicle includes a combustion engine, and an electric machine and storage battery coupled to one or more controller(s) configured to respond to various signals from a driver and vehicle components. In response, such controller(s) enable an automatic or auto ICE start stop capability that is managed for optimal HEV lifecycle operation, and fuel economy and efficiency. The controller(s) automatically start and stop the ICE in response to one or more of a torque demand signal, a vehicle speed signal, a steering torque power signal, and a brake signal. The controller(s) inhibit automatic stop of ICE responsive to the steering torque power exceeding a stop threshold, and in contrast initiate or enable automatic start responsive to the steering torque power exceeding a start threshold. The start threshold is calibrated and adjusted to exceed the stop threshold by a stability factor that is predetermined and/or adjusted by the controller(s).

18 Claims, 3 Drawing Sheets

(56) References Cited

U.S. PATENT DOCUMENTS

| | | | |
|---|---|---|---|
| 2012/0330529 A1* | 12/2012 | Pebley | F02N 11/084 701/101 |
| 2013/0001006 A1* | 1/2013 | Gibson | B62D 5/0481 180/446 |
| 2013/0002210 A1* | 1/2013 | Gibson | B60W 10/30 322/7 |
| 2013/0024056 A1* | 1/2013 | Aimo Boot | B60K 6/48 701/22 |
| 2013/0197759 A1* | 8/2013 | Urabe | B60W 30/18018 701/41 |
| 2013/0197787 A1* | 8/2013 | Urabe | B60W 10/20 701/112 |
| 2013/0245925 A1 | 9/2013 | Malone et al. | |
| 2015/0224845 A1* | 8/2015 | Anderson | B60G 17/019 701/37 |

* cited by examiner

FIG. 3

HYBRID VEHICLE WITH AUTO STOP START CONTROLLERS

TECHNICAL FIELD

The disclosure relates to engine auto stop start systems and methods for a hybrid electric vehicle.

BACKGROUND

Hybrid electric vehicle (HEVs) typically include an internal combustion engine (ICE) coupled with an electric machine or motor/generator (M/G), and include various other components including ICE auto start-stop controllers. Such HEVs may further include a steering unit that may be manually operated and/or that may include an electronic and power assisted steering unit, and related components. Typically, ICE auto-stop-start conditions are configured for micro, mild, and conventional hybrid operation, which are terms used to described various modes of operation, which are configured to manage fuel efficiency and economy, and HEV responsiveness to driver commands and demands for power from HEV components during the various modes of operation. Such modes of operation may be automatically enabled and disabled, and/or inhibited, uninhibited, and initiated during operation of the various HEV components, and during HEV slowing, low speeds, constant speed cruise, turning, and during braking and vehicle stops to improve fuel economy and responsiveness. Unmanaged demands from various driver commands and vehicle components can undesirably inhibit, uninhibit, and/or cause repeated cycling of the auto start-stop capabilities, and may create possibly unneeded or unwanted demands for ICE starts and stops, which in turn may create perceptions of less than optimal performance. Particularly, steering commands such as steering angle, torque, and power demands, among others, may at inopportune times, prevent or inhibit auto stop and may uninhibit or initiate auto start.

SUMMARY

The present disclosure enables improved HEV responsiveness and perceptions of performance while maintaining optimal life cycle operations, fuel efficiency, and economy during various modes of HEV operation. For example, when the HEV is enabled for automated stop start capabilities, one or more controllers of HEV may be configured to manage operation and responsiveness of such automatic start stop capabilities. For example, signals from a driver and various HEV components that demand power, such as for example brakes, HEV electronics and battery systems, climate control systems, steering, and HEV speed control systems, can be filtered and managed to ensure optimal, automatic stop and start of a combustion engine of HEV.

An HEV includes an internal combustion engine (ICE), and an electric machine or motor/generator (M/G) and storage battery coupled to power electronics and one or more controller(s) that are configured to respond to various signals from a driver and vehicle components. In response, such controller(s) are configured to enable and control an automatic or auto ICE start stop capability, which is managed for optimal HEV lifecycle operation, and fuel economy and efficiency. More specifically, at least one controller is configured to automatically start and stop the ICE in response to one or more of a torque demand signal, a vehicle speed signal, a steering and/or power signal, and a brake signal. The controller(s) inhibit automatic stop of ICE responsive to the steering signal or steering power exceeding a stop threshold, and in contrast initiate or uninhibit automatic start responsive to the steering signal and/or torque power exceeding a start threshold. The start threshold is calibrated and adjusted to exceed the stop threshold by a stability factor that is predetermined and/or calibrated, adjusted, and tuned by the controller(s).

The start and stop thresholds and the stability factor, may be a scalar and/or vector values that may be initially predetermined during factory manufacture of the HEV. These scalar and/or vector values may also be calibrated, adjusted, and tuned during HEV operation according to, for purposes of example without limitation, present or instantaneous, and/or rates of change, and/or an historical pattern of previous steering signals and/or powers, torque demand signals, and vehicle speed signals, among other HEV and ICE performance parameters. Additionally, the controller(s) may be further configured to inhibit automatic ICE stop in response to a change rate of the steering signal and/or power exceeding a change rate threshold.

In further arrangements of the disclosure, the HEV may further include an electronic power assisted steering unit that is coupled to the at least one controller(s), and which is configured to generate one or more of steering signals that may include and/or represent steering angle, torque, power, and change rate signals. The controller(s) may be further configured to inhibit automatic ICE stop in response to one or more of these signals equaling, exceeding, and/or not exceeding respective thresholds, which thresholds may include the described steering power and other start and stop thresholds, that may further include steering angle start and stop thresholds and steering change rate start and stop thresholds. Such respective steering angle, torque/power, and change rate start and stop thresholds may be the same, and also may be tuned, adjusted, and calibrated to specifically tailor HEV ICE auto stop start performance perceptions for each of such driver and component signals and power demand signals, including for example, the steering angle, power, and change rate signals, and other signals.

The disclosure further contemplates the controller(s) also configured to inhibit automatic ICE stop in response to the torque demand signal exceeding zero, or other predetermined or tuned, calibrated, and/or adjusted torque demand start stop thresholds and parameters. Further, the controller(s) is/are configured to inhibit automatic ICE stop in response to HEV speed exceeding an auto stop speed, or another threshold or parameter. In other exemplary adaptations, the controller(s) is/are configured to inhibit automatic stop unless the brake signal initiates braking. In combinations and further modifications, the controller(s) is/are configured to inhibit automatic stop in response to the HEV speed exceeding an auto stop speed, and the brake signal not initiating braking.

Methods of controlling and of operation of the HEV are also described and include, for example, by at least one controller, automatically starting and stopping the ICE in response to one or more of the torque demand signal, the vehicle speed, the steering signal and/or steering power signal, and the brake signal. Here, the method is also configured for inhibiting the stopping responsive to the steering signal and/or power exceeding a stop threshold, and for initiating the starting responsive to the steering signal and/or torque power exceeding a start threshold. As with the prior described variations, the start threshold exceeds the stop threshold by the stability factor.

The method of controlling and for operation of the HEV by the controller(s) include adjusting the stability factor and the start and stop thresholds according to the instantaneous, rates of change, and/or the historical pattern of previous steering signals and/or powers, torque demand signals, and vehicle speeds, among other thresholds and parameters. By the controller(s), the methods are also configured for inhibiting automatic stop responsive to a change rate of the steering signal and/or power exceeding a change rate threshold. The methods also contemplate generating one or more of the steering signals that may include, for example, steering angle, torque, power, and change rate signals, by the manually operated steering unit and/or the electronic power assisted steering unit, and inhibiting by controller(s) automatic ICE stop in response to one or more of the steering signal, and/or the steering angle, torque, power, and change rate signals equaling, exceeding, and/or not the respective thresholds.

This summary of the implementations and configurations of the HEVs and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, or applicability of the disclosure. The drawings are not necessarily made to scale.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes that are illustrated and described with reference to any one of the figures may be combined with features, components, and processes illustrated in one or more other figures to produce embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
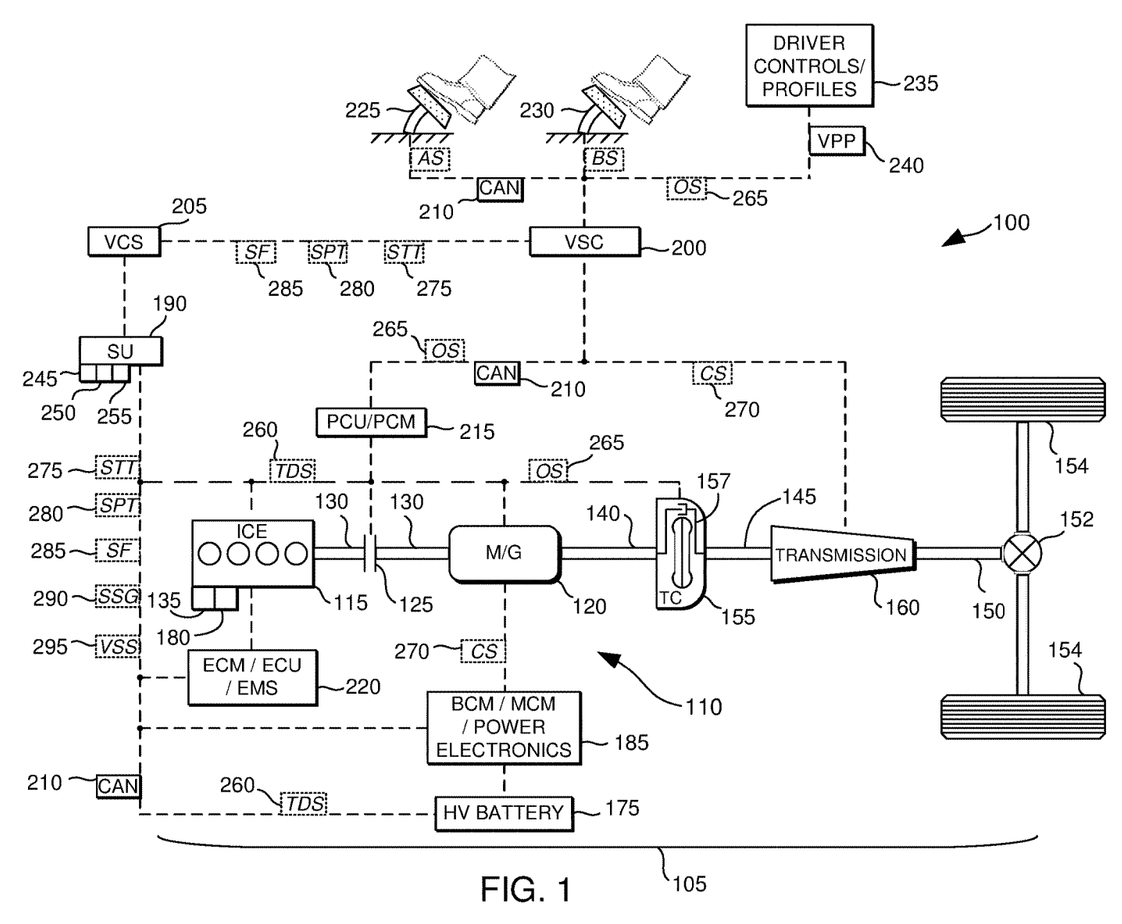
FIG. 1 is an illustration of a hybrid electric vehicle and its systems, components, sensors, actuators, and methods of operation.
Figure 2:
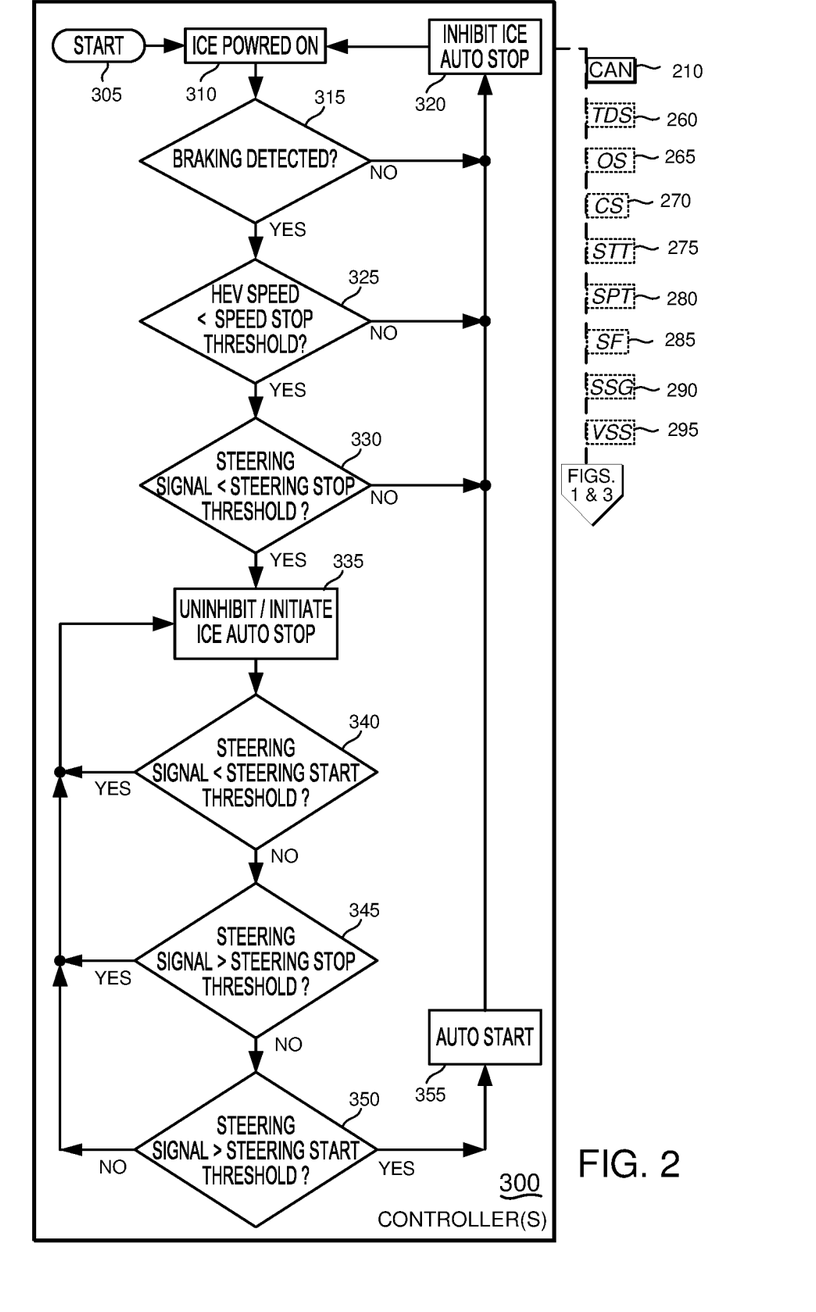
FIG. 2 illustrates certain capabilities and performance aspects of the disclosure depicted in FIG. 1, with components removed and rearranged for purposes of illustration.
Figure 3:
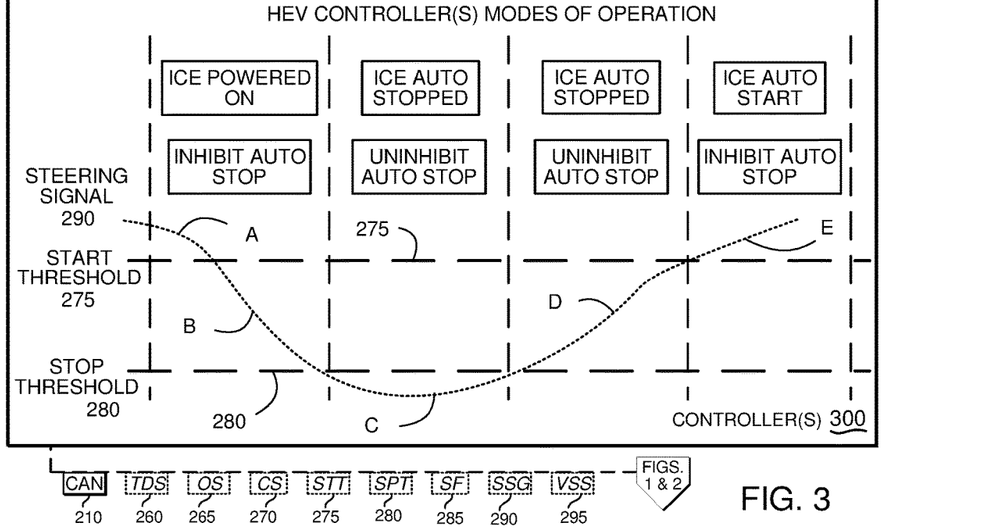
FIG. 3 illustrates additional aspects and capabilities of the vehicle and systems and methods of FIGS. 1 and 2, for purposes of further illustration.

With reference now to the various figures and illustrations and to FIGS. 1, 2, 3, and specifically now to FIG. 1, a schematic diagram of a hybrid electric vehicle (HEV) 100 is shown, and illustrates representative relationships among components of HEV 100. Physical placement and orientation of the components within vehicle 100 may vary. Vehicle 100 includes a driveline 105 that has a powertrain 110, which includes an internal combustion engine (ICE) 115 and an electric machine or electric motor/generator/starter (M/G) 120, which both generate mechanical and electric power and torque to propel vehicle 100, and power HEV systems and components. Engine 115 is a gasoline, diesel, biofuel, natural gas, or alternative fuel powered engine, or a fuel cell, which generates an output torque in addition to other forms of electrical, cooling, heating, vacuum, pressure, and hydraulic power by way of vehicle, front end engine accessories and other components as described elsewhere herein. Engine 115 is coupled to electric machine or M/G 120 with a disconnect clutch 125. Engine 115 generates such power and associated engine output torque for transmission to M/G 120 when disconnect clutch 125 is at least partially engaged.

M/G 120 may be any one of a plurality of types of electric machines, and for example may be a permanent magnet synchronous motor, electrical power generator, and engine starter 120. For example, when disconnect clutch 125 is at least partially engaged, power and torque may be transmitted from engine 115 to M/G 120 to enable operation as an electric generator, and to other components of vehicle 100. Similarly, M/G 120 may operate as a starter for engine 115 with disconnect clutch 125 partially or fully engaged to transmit power and torque via disconnect clutch drive shafts 130 to engine 115 to start engine 115, in vehicles that include or do not include an independent engine starter 135.

Further, M/G or electric machine 120 may assist engine 115 in a "hybrid electric mode" or an "electric assist mode" by transmitting additional positive-propulsion power and torque to turn drive shafts 130 and 140. Also, M/G 120 may operate in an electric only mode wherein engine 115 is decoupled by disconnect clutch 125 and shut down, enabling M/G 120 to transmit positive or negative torque to M/G drive shaft 140 for forward and reverse propulsion of HEV 100. When in generator mode, M/G 120 may also be commanded to produce negative torque or power and to thereby generate electricity for charging batteries and powering vehicle electrical systems and components, while engine 115 is generating propulsion power for vehicle 100 and/or for M/G 120. M/G 120 also may enable regenerative braking by converting rotational, kinetic energy from powertrain 110 and/or wheels 154 during deceleration, into regenerated electrical energy for storage, in one or more batteries 175, 180, as described in more detail below.

Disconnect clutch 125 may be disengaged to enable engine 115 to stop or to run independently for powering vehicle and engine accessories, while M/G 120 generates drive or engine-power and torque to propel vehicle 100 via M/G drive shaft 140, torque convertor drive shaft 145, and transmission output drive shaft 150. In other arrangements, both engine 115 and M/G 120 may operate with disconnect clutch 125 fully or partially engaged to cooperatively propel vehicle 100 through drive shafts 130, 140, 150, differential 152, and wheels 154. Driveline 105 may be further modified to enable regenerative braking from one or more and any wheel(s) 154 using a selectable and/or controllable differential torque capability.

Drive shaft 130 of engine 115 and M/G 120 may be a continuous, single, through shaft that is part of, and integral with M/G drive shaft 140, or may be a separate, independent drive shaft 130 that may be configured to turn independently of M/G drive shaft 140, for powertrains 110 that include multiple, inline, or otherwise coupled M/G 120 configurations. The schematic of FIG. 1 also contemplates alternative configurations with more than one engine 115 and/or M/G 120, which may be offset from drive shafts 130, 140, and where one or more of engines 115 and M/Gs 120 are positioned in series and/or in parallel elsewhere in driveline 105. Driveline 105 and powertrain 110 also include a transmission 160 that includes a torque convertor (TC) 155, which couples engine 115 and M/G 120 of powertrain 110 with and/or to a transmission 160. TC 155 may further incorporate a bypass clutch and clutch lock 157.

Powertrain 110 and/or driveline 105 further include one or more batteries 175, 180. One or more such batteries can be a higher voltage, direct current battery or batteries 175 operating in ranges between about 48 to 600 volts, and sometimes between about 140 and 300 volts or more or less, which is/are used to store and supply power for M/G 120 and during regenerative braking, and for other vehicle components and accessories. Other batteries can be a low voltage, direct current battery(ies) 180 operating in the range of between about 6 and 24 volts or more or less, which is/are used to store and supply power for starter 135 to start engine 115, and for other vehicle components and accessories.

Batteries 175, 180 are respectively coupled to engine 115, M/G 120, and vehicle 100, as depicted in FIG. 1, through various mechanical and electrical interfaces and vehicle controllers, as described elsewhere herein. High voltage M/G battery 175 is also coupled to M/G 120 by one or more of a motor control module (MCM), a battery control module (BCM), and/or power electronics 185, which may include power invertors and are configured to condition direct current (DC) power provided by high voltage (HV) battery 175 for M/G 120. MCM/BCM/power electronics 185 are also configured to condition, invert, and transform DC battery power into single and multiple phase, such as three phase, alternating current (AC) as is typically required to power electric machine or M/G 120. MCM/BCM/power electronics 185 is also configured to charge one or more batteries 175, 180 with energy generated by M/G 120 and/or front end accessory drive components, and to supply power to other vehicle components as needed.

For further example, various other vehicle functions, actuators, and components may be controlled by the controllers within the vehicle systems and components, and may receive signals from other controllers, sensors, and actuators, which may include, for purposes of illustration but not limitation, a manually operated and/or electronic power assisted steering unit (SU) 190, fuel injection timing and rate and duration, throttle valve position, spark plug ignition timing (for spark-ignition engines), intake/exhaust valve timing and duration, front-end accessory drive (FEAD) components, transmission oil pumps, a FEAD alternator or generator, M/G 120, high and low voltage batteries 175, 180, and various sensors for battery charging or discharging (including sensors for deriving, predicting, or establishing the maximum charge, state of charge—SoC, and discharge power limits), temperatures, voltages, currents, and battery discharge power limits, clutch pressures for disconnect clutch 125, bypass/launch clutch 157, TC 155, transmission 160, and other components.

With continued reference to FIG. 1, vehicle 100 further includes one or more controllers and computing modules and systems, in addition to MCM/BCM/power electronics 185, which enable a variety of vehicle capabilities. For example, vehicle 100 may incorporate a body control module and/or a body system controller, such as a vehicle system controller (VSC) 200 and a vehicle computing system (VCS) and controller 205, which are in communication with MCM/BCM 185, other controllers, and a vehicle network such as a controller area network (CAN) 210, and a larger vehicle control system and other vehicle networks that include other micro-processor-based controllers as described elsewhere herein. CAN 210 may also include network controllers in addition to communications links between controllers, sensors, actuators, and vehicle systems and components.

While illustrated here for purposes of example, as discrete, individual controllers, MCM/BCM 185, VSC 200 and VCS 205 may control, be controlled by, communicate signals to and from, and exchange data with other controllers, and other sensors, actuators, signals, and components that are part of the larger HEV and control systems and internal and external networks. The capabilities and configurations described in connection with any specific microprocessor-based controller(s) as contemplated herein, may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers both in the singular and plural connotations, and individually, collectively, and in various suitable cooperative and distributed processing and control combinations.

Further, communications over the network and CAN 210 are intended to include responding to, sharing, transmitting, and receiving of commands, signals, data, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip may be used to precondition and preprocess particular signals during communications, and before and after such are communicated.

In further illustrations, MCM/BCM 185, VSC 200, VCS 205, CAN 210, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing and communicating data With continuing attention to FIG. 1, HEV 100 also may include a powertrain control unit/module (PCU/PCM) 215 coupled to VSC 200 or another controller, and coupled to CAN 210 and engine 115, and M/G 120 to control each powertrain component. An engine control module (ECM) or unit (ECU) or energy management system (EMS) 220 may also be included having respectively integrated controllers and be in communication with CAN 210, and is coupled to engine 115 and VSC 200 in cooperation with PCU 215 and other controllers.

In these configurations and variations, VSC 200, VCS 205, and other controllers cooperatively manage and control the vehicle components and other controllers, sensors, and actuators. For example, the controllers may communicate control commands, logic, and instructions and code, data, information, and signals to and/or from engine 115, disconnect clutch 125, M/G 120, TC 155, transmission 160, batteries 175, 180, and MCM/BCM/power electronics 185, steering unit (SU) 190. and other components and systems. The controllers also may control and communicate with other vehicle components known to those skilled in the art, even though not shown in the figures.

The embodiments of vehicle 100 in FIG. 1 also depict exemplary sensors and actuators in communication with vehicle network and CAN 210 that can transmit and receive signals to and from SU 190, VSC 200, VCS 205, and other controllers. In further examples, vehicle 100 may include an accelerator sensor 225 generating an acceleration signal AS, a brake pedal sensor 230 generating a brake signal BS, and other driver controls and/or profiles 235, and vehicle profile and performance parameters (VPP) 240. Such driver controls 235 may also further include turn signal position sensors, selectable vehicle performance preference profiles and parameters, and driver selectable vehicle operational mode sensors and profile parameters and settings.

Further, vehicle 100 may have VCS 205 configured with one or more communications, navigation, and other sensors. The VCS 205 can cooperate in parallel, in series, and distributively with VSC 200, SU 190, and other controllers to manage and control the vehicle 100 in response to sensor and communication signals identified, generated by, established by, communicated to, and received from such vehicle systems and components.

Such parameters, profiles, and settings of such profiles, may be driver selectable, adjustable, and viewable through a vehicle user interface of an onboard vehicle computing system manufactured by the Ford Motor Company (See, for example, U.S. Pat. No. 9,080,668), which be a part of, work in connection with, and/or incorporated as VCS 205. Such sensors and controls 235 may also further include, for purposes of example without limitation, steering wheel position and motion sensors coupled to SU 190, such as an angle sensor 245, a steering torque and torque power sensor 250, and a steering torque rate change sensor 255, and related parameters and settings.

HEV 100 utilizes such sensors, parameters, and settings to enable automated stop start capabilities, in conjunction with the one or more controllers that are configured to manage these automatic start stop capabilities. For example, signals from a driver and various HEV components such as MCM/BCM 185 that demand power from ICE 115, may be embedded in and/or cause the controller(s) to generate a torque demand signal (TDS) 260. The controllers may also generate various other signals (OS) 265 and HEV control signals (CS) 270, which are utilized to communicate data to and from various HEV components, sensors, systems, and controllers. Further, the controllers may embed information in and extract information from TDS 260, OS 265, and CS 270, and may also communicate directly with vehicle controllers, sensors, actuators, systems, and components, to enable various communications and operations.

Controllers and components, such as VPP 240, may generate and communicate an auto start threshold (STT) 275, an auto stop threshold (SPT) 280 having a value less than STT 275, and a tuned and calibrated stability factor (SF) 285 that establishes the difference between STT 275 and SPT 280. SF 285 may be calibrated during manufacture of HEV 100 according to predetermined performance characteristics, and may be further tuned during subsequent operation to accommodate operation modes, and performance and environment conditions of HEV 100.

STT 275, SPT 280, and SF 285 may be a scalar values and/or vector values having additional data, which values may be initially predetermined during factory manufacture, programming, and configuration of HEV 100. As noted, these scalar and/or vector values may also be calibrated, adjusted, and tuned during HEV operation according to, for purposes of example without limitation, present or instantaneous performance parameters, and/or rates of change of such parameters, and/or an historical pattern of previous parameters that may include SSGs 290, TDSs 260, and VSSs 295, among other signals, data, and performance parameters.

Controllers and sensors such as SU 190 and related angle sensor 245, torque power sensor 250, and rate change sensor 255 may further generate and communicate respective signals and data such as steering signals SSG 290, which may embed, represent, and/or include steering angle SA, torque power STQ, and change rate SCR, among other signals and data.

With continuing reference to the various figures, including FIGS. 1, 2, and 3, the HEV 100 according to the disclosure includes ICE 115, M/G 120, and HV battery 175, coupled to one or more controller(s) and components, such as SU 190, VSC 200, VCS 205, controls 240, and VPP 245, which are configured to enable and control the automatic or auto start stop capability for ICE 115. More specifically, at least one controller, such controller 300 (FIG. 2) is configured to automatically start and stop the ICE 115 in response to the described signals and data, such as TDS 260, a vehicle speed signal VSS 295, SU 190 steering signals SSGs 290, and braking signal BS.

During operation of HEV 100, the controller(s), such as for example, controller 300, which may operate independently and/or be part of SU 190, VSC 200, VCS 205, or others, initiates control logic and commands at step 305 (FIG. 2) to control auto stop and start of ICE 115 when powered on at step 310 or auto stopped and powered off at step 335. In response to BS at step 315, automatic stop of ICE 115 is inhibited at step 320 if braking is not initiated. Otherwise, in response to BS commanding or initiating braking of HEV 100, then control proceeds to step 325, to detect whether VSS 295 indicates an HEV speed that is less than a vehicle speed auto stop threshold, which threshold may also be embedded in SPT 280 or another parameter. If VSS 295 exceeds the vehicle speed auto stop threshold, then ICE auto stop is again inhibited at step 320. But if VSS 295 is less, then control passes to step 330.

At step 330, if SSGs 290, such as angle SA, torque/power STQ, and change rate SCR, exceed SPT 280, then control proceeds again to step 320 and ICE auto stop is inhibited. In contrast, if SSGs 290 do not exceed SPT 280, then control passes to step 335 to uninhibit and/or initiate or enable ICE auto stop, such that ICE 115 is enabled and/or commanded to auto stop to conserve fuel. Exemplary controller 300 at step 355 also initiates automatic start in response to SSGs 290 exceeding STT 275. In variations, controller(s) such as controller 300 may be further configured to inhibit automatic ICE stop at step 320 in response to the SSG 290 being the STQ and/or SCR and exceeding an auto stop change rate threshold that is embedded as part of SPT 280 at step 330.

The controller(s), for example controller 300, is also configured to inhibit automatic ICE stop (step 320) in response to TDS 260 exceeding zero, or another predetermined or tuned, calibrated, and/or adjusted STT 275 and SPT 280 that may each include respective torque demand start and stop thresholds and parameters. Further, controller 300 is configured to inhibit automatic ICE stop (step 320) when VSS 295 exceeds an auto stop speed, or another threshold or parameter, which may also be embedded with SPT 280. In other exemplary adaptations, controller 300 is configured to inhibit automatic stop in response to VSS 295 exceeding the auto stop speed, and BS not initiating braking.

With continued reference to the figures, and especially FIG. 2, at step 340, controller 300 detects whether SSG 290 is less than STT 275, if so, then control moves to step 335 so that ICE auto stop is initiated and/or uninhibited such that ICE 115 may be auto stopped to conserve fuel. Otherwise, control passes to step 345 to detect whether SSG 290 exceeds SPT 280, and if so, ICE 115 is auto stopped or enabled to auto stop at step 335. If not, then control proceeds to step 350 to detect whether SSG 290 exceeds STT 275. If it does, then control moves to step 335 to enable/initiate auto stop, and if SSG 290 does exceed STT 275, then control proceeds to step 335 and ICE 115 is auto started (if previously stopped and not already running), and then proceeds to step 320 to inhibit auto stop. Controller 300 then continues monitoring as described above.

With continuing reference to the previously described figures, and now also to FIG. 3, it may be understood that the various arrangements and modifications of the disclosure may be illustrated in connection with a changing SSG 290, which changes between conditions "A", "B", "C", "D", and "E". When SSG 290 reflects a "zero" condition such that a steering wheel of HEV 100 is in a neutral position, then SSG 290 will not cause a response to a start stop capability of HEV 100. As SSG 290 changes in response to movement and actuation of the steering wheel, and progresses towards condition "A", when ICE 115 is running, and SSG 290 exceeds STT 275, which may be for example 6 newton-meters (N-m), then the one or more controller(s), such as controller 300, will inhibit auto stop of ICE 115 (step 320). As SSG 290 progresses to condition "B" where it represents steering wheel SA, STQ, SCR less than STT 275 and greater than or exceeding SPT 280 (step 325), which may be for example 2 N-m, then auto stop remains inhibited (step 320).

As SSG 290 progresses to condition "C" and represents a scalar or vector value less than SPT 280 (step 330), then auto stop is enabled or uninhibited (step 335), and ICE 115 may be stopped to conserve fuel. While SSG 290 begins to increase towards condition "D" as the steering wheel is actuated, but while SSG 290 remains below STT 275 (steps 340, 345), auto start of ICE 115 is delayed, auto stop remains uninhibited, and ICE 115 remains stopped or unpowered and is not immediately auto started (step 335). However, as SSG 290 progresses to condition "E" and the steering wheel is actuated more quickly, at a faster rate of change, and/or with a higher torque or torque power such that STT 275 is exceeded, then ICE 115 may be auto started and auto stop may be again inhibited (steps 350, 355).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
   at least one controller configured to:
      automatically start and stop an engine responsive to one or more of a torque demand signal, a vehicle speed, a steering power, and a brake signal,
      inhibit automatic stop responsive to the steering power exceeding a stop threshold,
      initiate automatic start responsive to the steering power exceeding a start threshold by a stability factor that varies according to a historical pattern of previous steering powers, torque demand signals, and vehicle speeds.

2. The vehicle according to claim 1, further comprising:
   the at least one controller configured to inhibit automatic stop responsive to a change rate of the steering power exceeding a change rate threshold.

3. The vehicle according to claim 1, further comprising:
   an electronic power assisted steering unit coupled to the at least one controller and configured to generate one or more of steering angle, power, and change rate signals; and
   the at least one controller configured to inhibit automatic stop responsive to one or more of the steering angle, power, and change rate signals exceeding respective thresholds.

4. The vehicle according to claim 1, further comprising:
   the at least one controller configured to inhibit automatic stop responsive to the torque demand signal exceeding zero.

5. The vehicle according to claim 1, further comprising:
   the at least one controller configured to inhibit automatic stop responsive to the vehicle speed exceeding an auto stop speed.

6. The vehicle according to claim 1, further comprising:
   the at least one controller configured to inhibit automatic stop unless the brake signal initiates braking.

7. The vehicle according to claim 1, further comprising:
   the at least one controller configured to inhibit automatic stop responsive to
      the vehicle speed exceeding an auto stop speed, and
      the brake signal not initiating braking.

8. A vehicle, comprising:
a steering unit configured to generate one or more of steering angle, power, and change rate signals; and
a controller configured to
inhibit automatic engine stop responsive to the steering power signal exceeding a stop threshold, and
initiate automatic engine start responsive to the steering power exceeding a start threshold that exceeds the stop threshold by a stability factor that varies according to an historical pattern of previous steering powers, torque demand signals, or vehicle speeds.

9. The vehicle according to claim 8, further comprising:
the controller configured to inhibit automatic engine stop responsive to the steering change rate signal exceeding a change rate threshold.

10. The vehicle according to claim 8, further comprising:
the controller configured to inhibit automatic engine stop and initiate automatic engine start responsive to one or more of the steering angle signal exceeding an angle threshold, and the steering change rate signal exceeding a change rate threshold.

11. The vehicle according to claim 8, further comprising:
the controller configured to inhibit automatic engine stop responsive to a torque demand signal exceeding zero.

12. The vehicle according to claim 8, further comprising:
the controller configured to inhibit automatic engine stop responsive to a vehicle speed exceeding an auto stop speed.

13. The vehicle according to claim 8, further comprising:
the controller configured to inhibit automatic engine stop unless a brake signal initiates braking.

14. The vehicle according to claim 8, further comprising:
the controller configured to inhibit automatic engine stop responsive to a vehicle speed exceeding an auto stop speed.

15. The vehicle according to claim 8, further comprising:
the controller configured to inhibit automatic engine stop unless a brake signal initiates braking.

16. A method of controlling a vehicle, comprising:
by at least one controller
automatically starting and stopping an engine responsive to one or more of a torque demand signal, a vehicle speed, a steering power, and a brake signal,
inhibiting the stopping responsive to the steering power exceeding a stop threshold,
initiating the starting responsive to the steering power exceeding a start threshold by a stability factor,
adjusting the stability factor and the start and stop thresholds according to a historical pattern of previous steering powers, torque demand signals, or vehicle speeds.

17. The method of controlling the vehicle according to claim 16, further comprising:
by the at least one controller
inhibiting the stopping responsive to a change rate of the steering power exceeding a change rate threshold.

18. The method of controlling the vehicle according to claim 16, further comprising:
generating one or more of steering angle, power, and change rate signals, by an electronic power assisted steering unit; and
inhibiting by the at least one controller the stopping responsive to one or more of the steering angle, power, and change rate signals exceeding respective thresholds.

* * * * *